United States Patent
Cheng et al.

(10) Patent No.: US 10,742,783 B2
(45) Date of Patent: Aug. 11, 2020

(54) DATA TRANSMITTING APPARATUS, DATA RECEIVING APPARATUS AND METHOD THEREOF HAVING ENCODING OR DECODING FUNCTIONALITIES

(71) Applicant: INDUSTRIAL TECHNOLOGY RESEARCH INSTITUTE, Hsinchu (TW)

(72) Inventors: Tsung-Sheng Cheng, Hsinchu (TW);
Yi-Hung Lu, Hsinchu (TW);
Kuen-Min Lee, Hsinchu (TW);
Yu-Chang Chao, Hsinchu (TW);
Yu-Tse Lin, Hsinchu (TW); Jung-Chih Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/859,870

(22) Filed: Jan. 2, 2018

(65) Prior Publication Data
US 2019/0020743 A1 Jan. 17, 2019

(30) Foreign Application Priority Data
Jul. 17, 2017 (TW) .............................. 106123792 A

(51) Int. Cl.
*H04W 72/04* (2009.01)
*H04L 29/08* (2006.01)

(52) U.S. Cl.
CPC .................................. *H04L 69/324* (2013.01)

(58) Field of Classification Search
CPC ...................................................... H04L 69/324
See application file for complete search history.

(56) References Cited

U.S. PATENT DOCUMENTS 4,099,257 A * 7/1978 Arnold ................ H03M 7/4025
341/67
5,867,114 A * 2/1999 Barbir ..................... G06T 9/005
341/107
(Continued)

FOREIGN PATENT DOCUMENTS

| CN | 104331269 | 2/2015 |
| CN | 104636377 | 5/2015 |

(Continued)

OTHER PUBLICATIONS

Taiwanese Office Action for Taiwanese Patent Application No. 106123792 dated Jun. 28, 2018.
(Continued)

*Primary Examiner* — Hassan Kizou
*Assistant Examiner* — Mahbubul Bar Chowdhury
(74) *Attorney, Agent, or Firm* — Amin, Turocy & Watson, LLP

(57) ABSTRACT

A data transmitting apparatus, a data receiving apparatus and methods thereof are provided. The data transmitting apparatus includes an encoding module, an encoding table, a first encoding parameter, a second encoding parameter and a transmitting module. The encoding module reads and encodes data content containing at least one data unit. The encoding table records a variety of information of multiple data units, and the variety of information contain a unit content, a number of times encoded and a recorded position of each of the data units. The first encoding parameter provides first information of the data unit, and the first information relate to an existing state of the unit content of the data unit in the encoding table. The second encoding parameter provides second information, and the second information relate to an amount of data units currently (Continued)

recorded in the encoding table. The transmitting module transmits an encoded data.

16 Claims, 13 Drawing Sheets

(56) References Cited

U.S. PATENT DOCUMENTS

| | | | | |
|---|---|---|---|---|
| 6,100,824 | A * | 8/2000 | MacLeod | H03M 7/3088 |
| | | | | 341/106 |
| 6,563,440 | B1 * | 5/2003 | Kangas | H03M 7/42 |
| | | | | 341/65 |
| 6,668,092 | B1 | 12/2003 | Sriram et al. | |
| 6,707,400 | B2 * | 3/2004 | Christofferson | H03M 7/3088 |
| | | | | 341/106 |
| 6,856,651 | B2 * | 2/2005 | Singh | H03M 7/30 |
| | | | | 348/384.1 |
| 7,348,904 | B2 | 3/2008 | Christoffersson et al. | |
| 8,537,038 | B1 | 9/2013 | Semenyuk et al. | |
| 8,572,218 | B2 | 10/2013 | Narayanan et al. | |
| 10,003,356 | B2 * | 6/2018 | Willner | H03M 7/4031 |
| 2002/0058501 | A1 * | 5/2002 | Hannu | H03M 7/3088 |
| | | | | 455/432.2 |
| 2002/0059462 | A1 * | 5/2002 | Hannu | H03M 7/30 |
| | | | | 709/247 |
| 2005/0210151 | A1 * | 9/2005 | Abdo | H03M 7/30 |
| | | | | 709/247 |
| 2011/0185077 | A1 * | 7/2011 | Bremler-Barr | H03M 7/3086 |
| | | | | 709/231 |
| 2012/0221540 | A1 | 8/2012 | Rose et al. | |
| 2014/0214779 | A1 * | 7/2014 | Francis | H04L 67/06 |
| | | | | 707/693 |

FOREIGN PATENT DOCUMENTS

| | | |
|---|---|---|
| TW | 429726 | 4/2001 |
| TW | 201303881 | 1/2013 |
| TW | 201403337 | 1/2014 |
| TW | 201546815 | 12/2015 |

OTHER PUBLICATIONS

Schroeder, et al. "Web Servers Under Overload: How Scheduling Can Help", ACM Transactions on Internet Technology (TOIT), 2006, pp. 20-52.

Huang, et al. "Packet-Level Clustering for Memory-Assisted Compression of Network Packets", In Wireless Communications and Signal Processing (WCSP), 2014 Sixth International Conference on IEEE, Oct. 2014, pp. 1-6.

Bhosale, et al. "Data Compression Algorithm for Wireless Sensor Network", International Research Journal of Multidisciplinary Studies, 2016.

Sharma, et al. "An Improved Dynamic Bit Reduction Algorithm for Lossless Text Data Compression", International Journal of Advanced Research in Computer Science and Software Engineering (IJARCSSE), Jul. 2014, pp. 1023-1029.

Kartakis, et al. "Energy-based Adaptive Compression in Water Network Control Systems", In Cyber-physical Systems for Smart Water Networks (CySWater), 2016 International Workshop on IEEE, Apr. 2016, pp. 43-48.

Kolo, et al. "An Adaptive Lossless Data Compression Scheme for Wireless Sensor Networks", Journal of Sensors, 2012(2012), Sep. 2012, pp. 1-20.

Sailunaz, et al. "Data Compression Considering Text Files", International Journal of Computer Applications, 90(11), Mar. 2014, pp. 27-32.

* cited by examiner

FIG. 3A

| T1 | | | |
|---|---|---|---|
| Recorded Position | 0 | 1 | 2 | 3 |
| Unit Content | * | | | |
| Number of Times Encoded | - | | | |

- (Encoded Module) Data Content : A B A A A A A A C C
- First Information of First Encoding Parameter (FIT1) : No
- Second Information of Second Encoding Parameter (ES1) : <u>1</u>
- (Transmitting Module) Encoded Data :

FIG. 3B

| T1 | Data Unit | | |
|---|---|---|---|
| Recorded Position | 0 | 1 | 2 | 3 |
| Unit Content | * | A | | |
| Number of Times Encoded | - | 1 | | |

- (Encoded Module) Data Content : <u>A</u> B A A A A A A C C
  ↑ First Data Unit (0100 0001)
- First Information of First Encoding Parameter (FIT1) : No
- Second Information of Second Encoding Parameter (ES1) : <u>1</u>
- (Transmitting Module) Encoded Data : 0 0100 0001

{Content Code / Identification Code} = First Encoded Unit

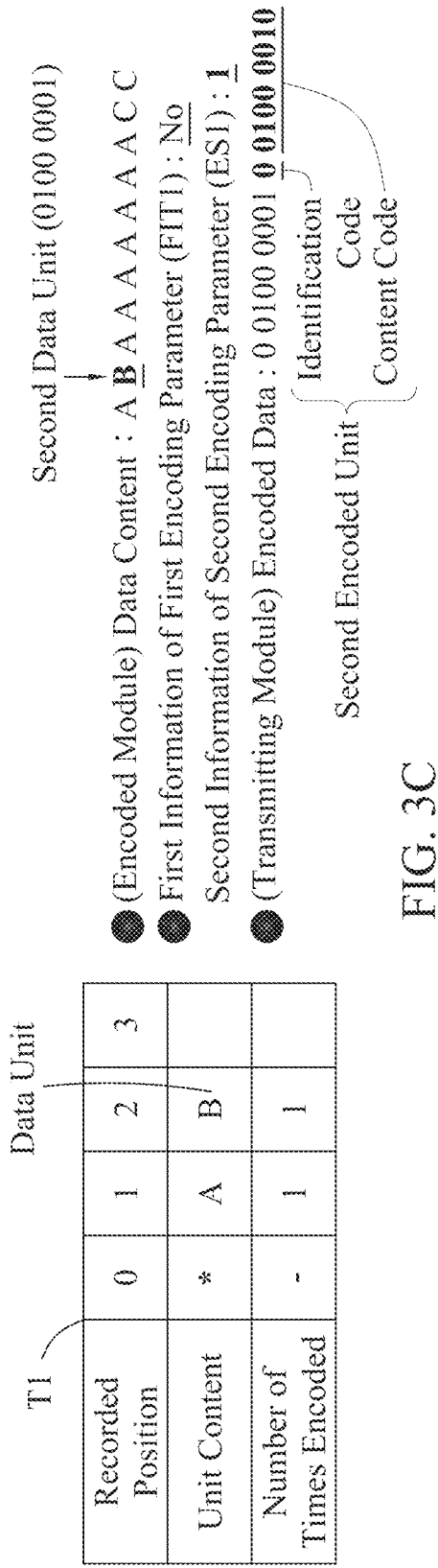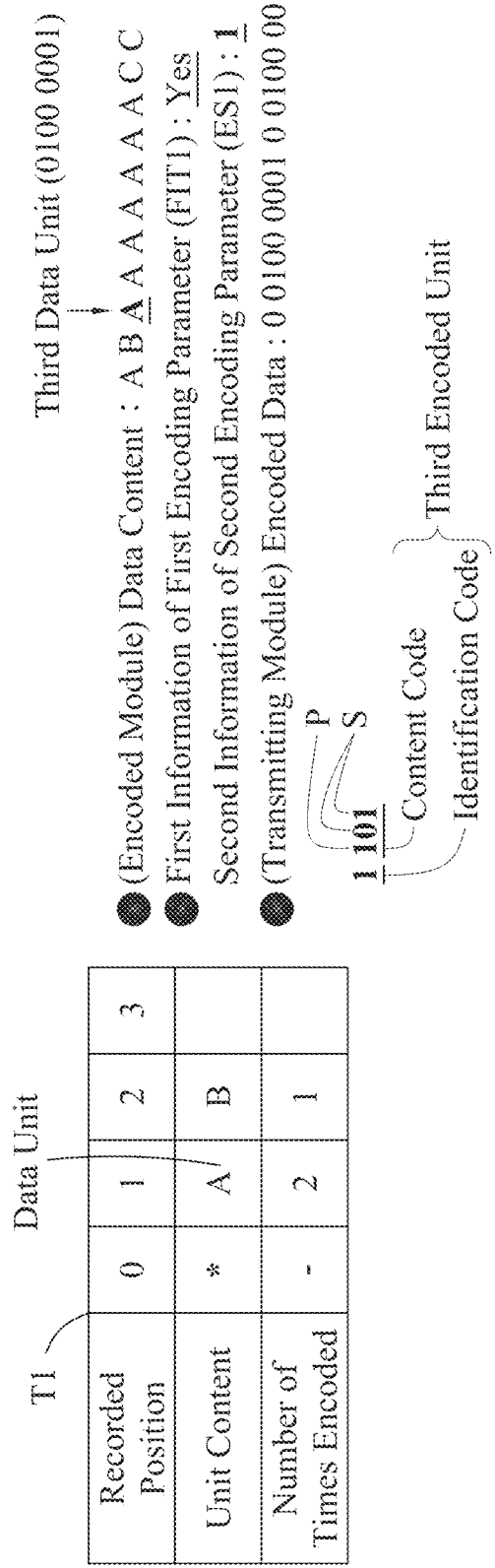
FIG. 3C
FIG. 3D

- (Encoded Module) Data Content : 0 0100 0001 0 0100 0010 1 101 00 111111 0 00 0100 0011 1 111
- First Information of First Encoding Parameter (FIT1) : No
- Second Information of Second Encoding Parameter (ES1) : 1
- (Transmitting Module) Encoded Data :

| T2 | | | |
|---|---|---|---|
| Recorded Position | 0 | 1 | 2 | 3 |
| Unit Content | * | | | |
| Number of Times Encoded | - | | | |

FIG. 5A

- (Receiving Module) Encoded Data : 0 0100 0001 0 0100 0010 1 101 00 111111 0 00 0100 0011 1 111
  - Identification Code / Content Code } First Encoded Unit
- First Information of First Encoding Parameter (FIT2) : No
- Second Information of Second Encoding Parameter (ES2) : 1
- (Decoding Module) Data Content : A ← First Data Unit

| T2 | | Data Unit | |
|---|---|---|---|
| Recorded Position | 0 | 1 | 2 | 3 |
| Unit Content | * | A | | |
| Number of Times Encoded | - | 1 | | |

FIG. 5B

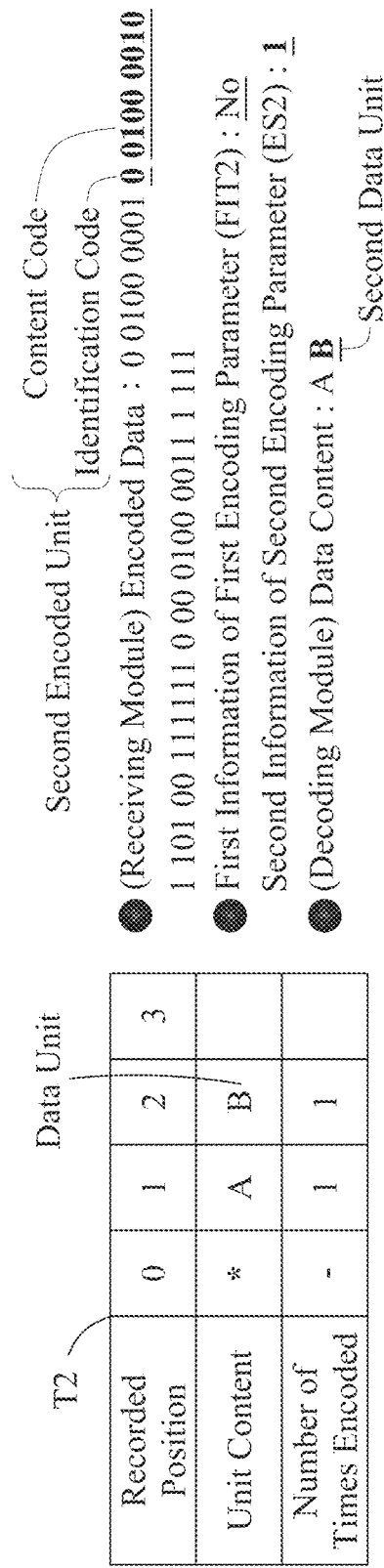
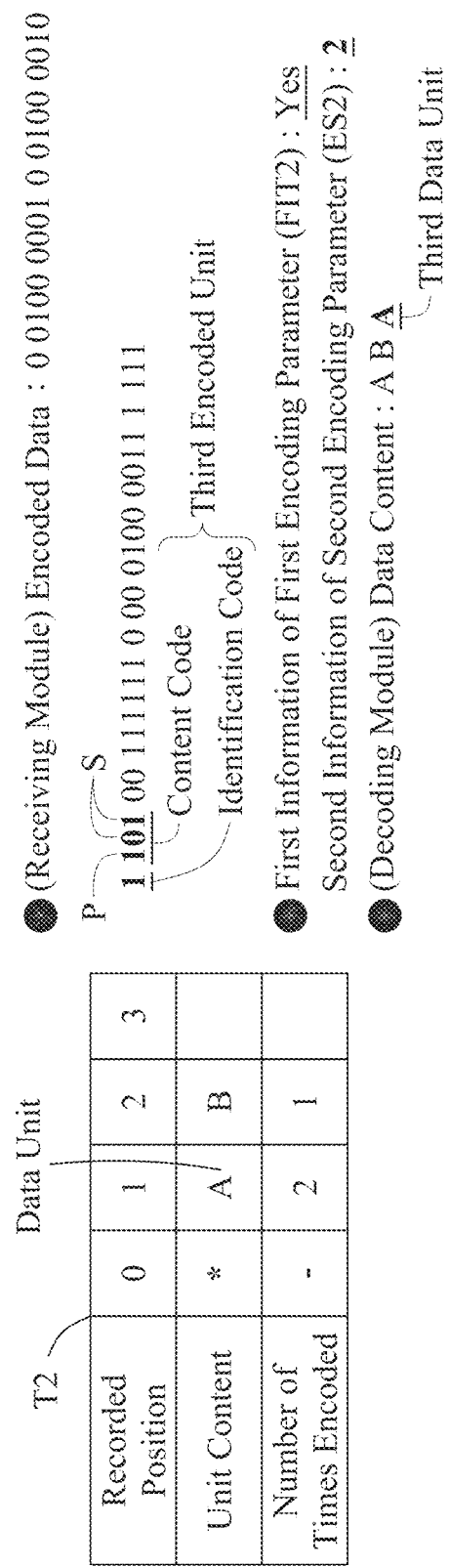
FIG. 5C
FIG. 5D

DATA TRANSMITTING APPARATUS, DATA RECEIVING APPARATUS AND METHOD THEREOF HAVING ENCODING OR DECODING FUNCTIONALITIES

CROSS-REFERENCE TO RELATED APPLICATION

The present application is based on, and claims priority from, Taiwan Application Serial Number 106123792, filed on Jul. 17, 2017, the disclosure of which is hereby incorporated by reference herein in its entirety.

BACKGROUND

1. Technical Field

The present disclosure relates to data transmitting apparatuses, data receiving apparatuses and methods thereof, and, more particularly, to a data transmitting apparatus, a data receiving apparatus and methods thereof having encoding/decoding functionalities.

2. Description of Related Art

With the rise of the "industry 4.0" concept, smart manufacturing processes start to take a whole new route. With the introduction of intelligent integrated sensory control systems and the ability to link to "Internet of Things" and service networks, a new business model of "smart manufacturing+service" is starting to take shape. At the same time, in the face of increasing networking equipment but limited transmission network bandwidth, the efficiency of industrial network transmission needs to be improved in order to reduce the number of network transmission packets and network load, which in turn reduces the overhead of the network equipment.

However, there are too many burdens in the current network transmission protocols. In practice, batch reading or a more compact format is used to alleviate the burdens. For example, Open Platform Communication-Unified Architecture (OPC UA) defines a UA binary format to reduce data contents and the number of network packets. However, a lot of duplication of information are often used to accommodate the format length, resulting in unnecessary waste of time and repetition of information.

Therefore, there is a need for a solution that addresses the aforementioned issues in the prior art.

SUMMARY

In view of the aforementioned shortcomings of the prior art, the present disclosure provides a data transmitting apparatus, a data receiving apparatus and methods thereof to improve the compression rate of data contents and reduce the number of packets of the data contents.

The data transmitting apparatus according to the present disclosure may include: an encoding module for reading a data content including at least one of a plurality of data units and encoding the data unit; an encoding table for recording a variety of information of the plurality of data units, the variety of information including a unit content, a number of times encoded and a recorded position of each of the data units; a first encoding parameter for providing a first information of the data unit read by the encoding module, wherein the first information relates to an existing state of the unit content of the data unit in the encoding table; a second encoding parameter for providing a second information, wherein the second information relates to an amount of data units currently recorded in the encoding table; and a transmitting module for transmitting an encoded data encoded by the encoding module, wherein the encoded data includes an encoded unit corresponding to the data unit, and the encoded unit includes an identification code and a content code, wherein the encoding module sets the identification code or the content code based on the first information of the first encoding parameter and the second information of the second encoding parameter, and updates the unit content, the number of times encoded or the recorded position of each of the data units in the encoding table.

The data transmitting method according to the present disclosure may include: reading a data content including at least one of a plurality of data units, and encoding the data unit; recording a variety of information of the plurality of data units in an encoding table, wherein the variety of information include a unit content, a number of times encoded and a recorded position of each of the data units; a first encoding parameter providing first information of the data unit read by the encoding module, wherein the first information relate to an existing state of the unit content of the data unit in the encoding table; a second encoding parameter providing second information, wherein the second information relate to an amount of data units currently recorded in the encoding table; and transmitting an encoded data encoded by the encoding module, wherein the encoded data includes an encoded unit corresponding to the data unit, and the encoded unit includes an identification code and a content code, wherein the identification code or the content code are set based on the first information of the first encoding parameter and the second information of the second encoding parameter, and the unit content, the number of times encoded or the recorded position of the data unit is updated in the encoding table.

The data receiving apparatus according to the present disclosure may include: a receiving module for receiving an encoded data, wherein the encoded data includes at least one encoded unit, the encoded unit including an identification code and a content code; a decoding module for reading a data content of the encoded unit received by the receiving module and decoding the encoded unit to obtain a data unit of a plurality of data units corresponding to the encoded unit; an encoding table for recording a variety of information of the plurality of data units, wherein the variety of information include a unit content, a number of times encoded and a recorded position of each of the data units; a first encoding parameter for providing first information of the data unit read by the decoding module, wherein the first information relate to an existing state of the unit content of the data unit read by the decoding module in the encoding table; and a second encoding parameter for providing second information, wherein the second information relate to an amount of data units currently recorded in the encoding table, wherein the decoding module obtains the data unit corresponding to the encoded unit based on the first information of the first encoding parameter, the second information of the second encoding parameter, and the identification code and the content code of the encoded unit, and the decoding module updates the unit content, the number of times encoded or the recorded position of the data unit in the encoding table.

The data receiving method according to the present disclosure may include: receiving an encoded data, wherein the encoded data includes at least one encoded unit, the encoded unit including an identification code and a content code;

reading a data content of the encoded unit and decoding the encoded unit to obtain a data unit of a plurality of data units corresponding to the encoded unit; recording a variety of information of the plurality of data units in an encoding table, wherein the variety of information include a unit content, the number of times encoded and a recorded position of each of the data units; a first encoding parameter providing a first information of the data unit read by the decoding module, wherein the first information relates to an existing state of the unit content of the data unit read by the decoding module in the encoding table; and a second encoding parameter providing a second information, wherein the second information relates to the amount of data units currently recorded in the encoding table, wherein the data unit corresponding to the encoded unit is obtained based on the first information of the first encoding parameter, the second information of the second encoding parameter, and the identification code and the content code of the encoded unit, and the unit content, the number of times encoded or the recorded position of the data unit is updated in the encoding table.

BRIEF DESCRIPTION OF THE DRAWINGS

The present disclosure can be more fully understood by reading the following detailed description of the embodiments, with reference made to the accompanying drawings, wherein:

FIGS. 3A to 3G are schematic diagrams depicting a data encoding and transmission method in accordance with an embodiment of the present disclosure;

FIGS. 5A to 5G are schematic diagrams depicting a data receiving and decoding method in accordance with an embodiment of the present disclosure;

DETAILED DESCRIPTION OF THE EMBODIMENTS

Figure 1:
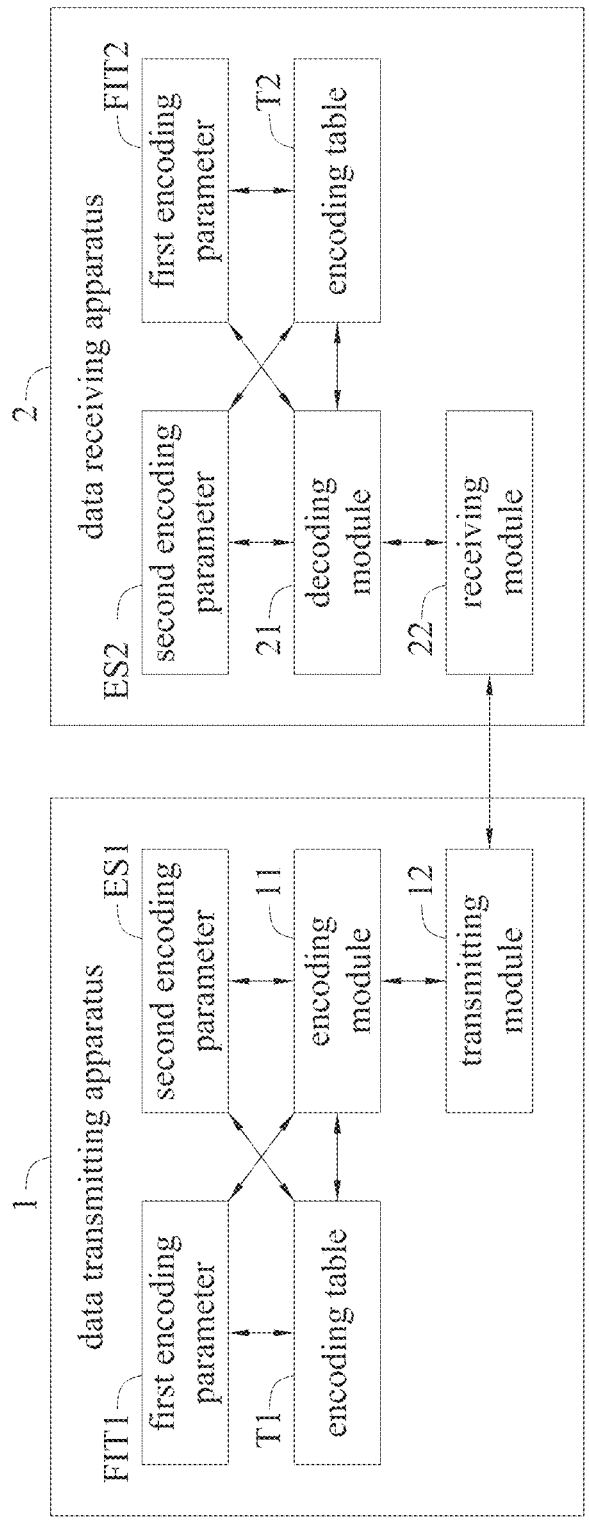
FIG. 1 is a block diagram depicting a data transmitting apparatus and a data receiving apparatus in accordance with an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram depicting a data transmitting apparatus 1 and a data receiving apparatus 2 in accordance with an embodiment of the present disclosure. The data transmitting apparatus 1 includes an encoding module 11, an encoding table T1, a first encoding parameter FIT1 (Find_in_Table), a second encoding parameter ES1 (Encode_Size) and a transmitting module 12.

In an embodiment, the data transmitting apparatus 1 includes a memory and a central processing unit (CPU), but the present disclosure is not so limited. The data transmitting apparatus 1 can be a system or an apparatus, such as a server or a computer (e.g., industrial computer), and may use a standard communication protocol, such as Open Platform Communication (OPC) or OPC UA (Open Platform Communication-Unified Architecture), but the present disclosure is not limited to these.

The encoding module 11 is used for reading a data content containing at least one data unit, and encoding the data content. The encoding module 11 can be realized by, for example, an encoder, a processor, an arithmetic logic unit (ALU), an integrated circuit (IC) or a processing program, and can be implemented in software, firmware, hardware, or a combination thereof.

The encoding table T1 is used for recording a variety of information of a plurality of data units, and the variety of information include a unit content, the number of times encoded and the recorded position of each of the data units.

The first encoding parameter FIT1 is used for providing first information of the data unit read by the encoding module 11, and the first information relates to an existing state of the unit content of the data unit read by the encoding module 11 in the encoding table T1.

The second encoding parameter ES1 is used for providing second information, and the second information relates to the amount of data units currently recorded in the encoding table T1.

In an embodiment, the encoding table T1, the first encoding parameter FIT1 and the second encoding parameter ES1 can be implemented in one or more memories, but the present disclosure is not limited to this. In an embodiment, the memory or memories implementing the encoding table T1, the first encoding parameter FIT1 and the second encoding parameter ES1 can be the same memory or different memories.

The transmitting module 12 is used for transmitting the encoded data encoded by the encoding module 11. The encoded data includes at least one encoded unit corresponding to the data unit, and the encoded unit contains an identification code and a content code. The transmitting module 12 can be a transmitter, an input/output (I/O) interface, a communication interface, an antenna, a network card, or the like, and the present disclosure is not limited as such.

The encoding module 11 can set the identification code or the content code of the at least one encoded unit based on the first information of the first encoding parameter and the second information of the second encoding parameter. The encoding module 11 can also update the unit content, the number of times encoded or the recorded position of each of the data units recorded in the encoding table T1 based on the first information of the first encoding parameter, and the recorded position of each of the data units in the encoding table T1 is related to the number of times encoded.

Moreover, as shown in the embodiment of FIG. 1, the data receiving apparatus 2 includes a receiving module 22, a decoding module 21, an encoding table T2, a first encoding parameter FIT2 and a second encoding parameter ES2. The data receiving apparatus 2 can also include a memory and a CPU, but the present disclosure is not limited to these. The data receiving apparatus 2 can be a system or an apparatus, such as a server or a computer (e.g., industrial computer), and may use a standard communication protocol, such as OPC or OPC UA, but the present disclosure is not limited to these.

The receiving module 22 is used for receiving the encoded data encoded by the encoding module 11 of the data transmitting apparatus 1. The encoded data includes at least one encoded unit, and the encoded unit includes the identification code and the content code. The receiving module 22 can be, for example, a receiver, an I/O interface, a wired or wireless communication interface, an antenna, a network card, and etc.

The decoding module 21 is used for reading a data content of the at least one encoded unit received by the receiving module 22 and decoding the at least one encoded unit. The decoding module 21 can be realized by, for example, an encoder, a processor, an ALU, an IC or a processing program, and can be implemented in software, firmware, hardware, or a combination thereof.

The encoding table T2 is used for recording a variety of information of a plurality of data units, and the variety of information include a unit content, the number of times encoded and the recorded position of each of the data units.

The first encoding parameter FIT2 is used for providing first information of the encoded unit read by the decoding module 21, and the first information relates to an existing state of the unit content of the encoded unit read by the decoding module 21 in the encoding table T2.

The second encoding parameter ES2 is used for providing second information, and the second information relates to the amount of data units currently recorded in the encoding table T2.

In an embodiment, the encoding table T2, the first encoding parameter FIT2 and the second encoding parameter ES2 can be implemented in one or more memories, but the present disclosure is not limited to this. In an embodiment, the memory or memories implementing the encoding table T2, the first encoding parameter FIT2 and the second encoding parameter ES2 can be the same memory or different memories.

The decoding module 21 can obtain at least one data unit corresponding to the at least one encoded unit based on the first information of the first encoding parameter, the second information of the second encoding parameter, the identification code and the content code of the at least one encoded unit. The decoding module 21 can also update the unit content, the number of times encoded or the recorded position of each of the data units recorded in the encoding table T2 based on the first information of the first encoding parameter FIT2, and the recorded position of each of the data units in the encoding table T2 is related to the number of times encoded.

Figure 2:
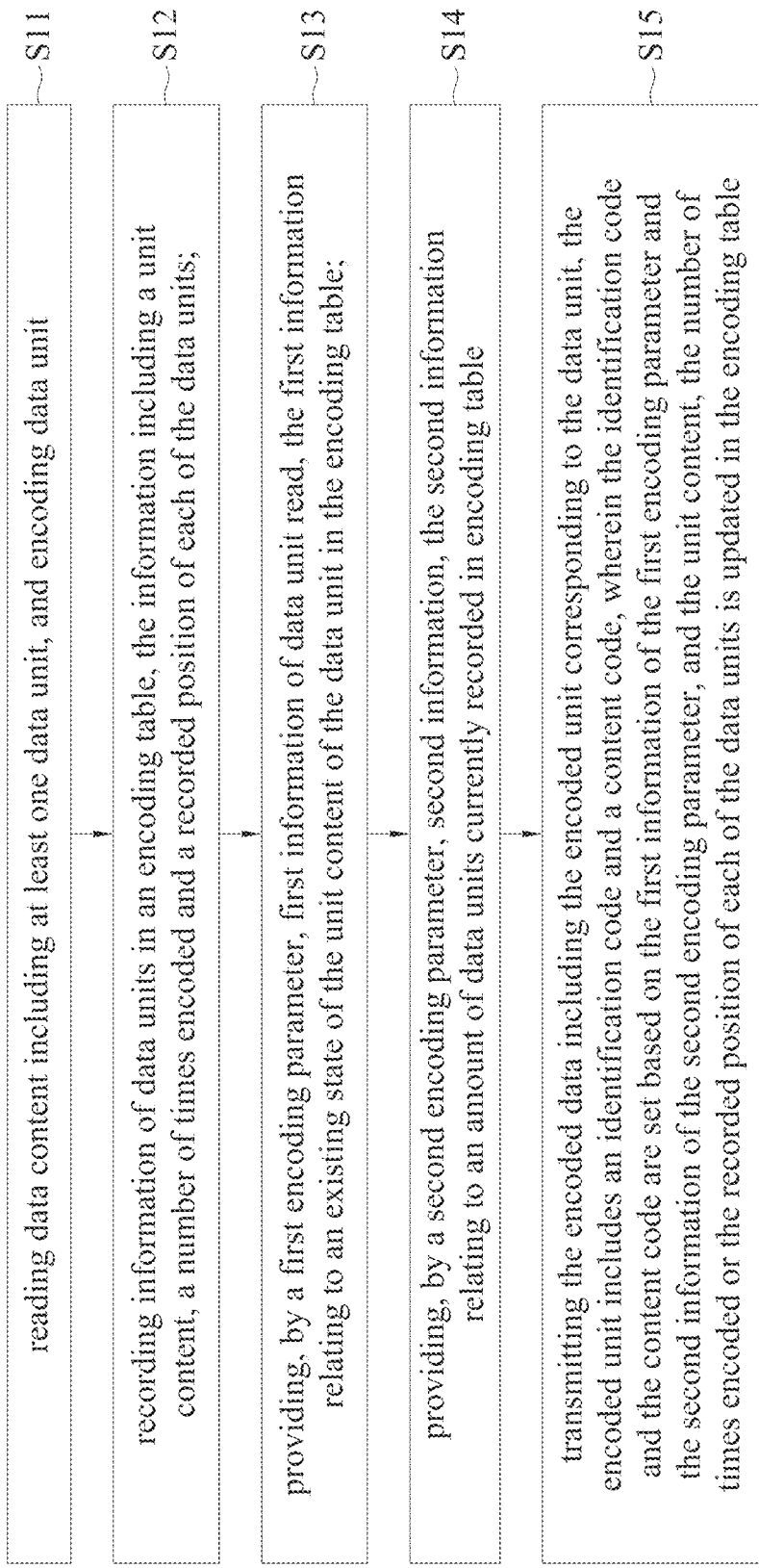
FIG. 2 is a flowchart illustrating a data transmission method in accordance with an embodiment of the present disclosure.

FIG. 2 is a flowchart illustrating a data transmission method in accordance with an embodiment of the present disclosure. The following descriptions are to be taken in conjunction with FIG. 1 above and various embodiments in FIGS. 3A to 3G below. In the embodiment of FIG. 2, the data transmission method includes, but is not limited to, steps S11 to S15, and the present disclosure does not limit the order in which they are carried out.

In step S11 of FIG. 2, the encoding module 11 reads a data content including at least one data unit (e.g., a first data unit "A" shown in FIG. 3B), and encodes the at least one data unit in the data content.

In step S12 of FIG. 2, the encoding table T1 records a variety of information of a plurality of data units, and the variety of information includes a unit content, the number of times encoded and the recorded position of each of the data units in the encoding table T1.

In step S13 of FIG. 2, the first encoding parameter FIT1 provides first information of the data unit read, and the first information relates to the existing state of the unit content of the data unit being read in the encoding table T1.

In step S14 of FIG. 2, the second encoding parameter ES1 provides second information, and the second information relates to the amount of data units currently recorded in the encoding table T1.

In step S15 of FIG. 2, the transmitting module 12 transmits an encoded data after encoding. The encoded data includes at least one encoded unit (e.g., a first encoded unit shown in FIG. 3B) corresponding to the at least one data unit. The encoded unit includes an identification code and a content code. Moreover, based on the first information of the first encoding parameter FIT1 and the second information of the second encoding parameter ES1, the identification code and the content code of the encoded unit are set, and the unit content, the number of times encoded and the recorded position of each of the data units recorded in the encoding table T1 are updated.

In the data transmitting apparatus 1 of FIG. 1 and the data transmission method of FIG. 2, the plurality of data units recorded in the encoding table T1 are placed in their respective recorded positions based on the number of times the respective data units have been encoded.

If the existing state related to the first information of the first encoding parameter FIT1 is "false", the encoding module 11 directly encodes the unit content in the data unit into the unit content of the encoded unit according to an encoding rule, wherein the encoding rule can be binary coding, such as ASCII or UTF.

If the existing state related to the first information of the first encoding parameter FIT1 is "true", it is indicated that the unit content of the data unit read by the encoding module 11 exists in one of the plurality of data units recorded in the encoding table T1. The second information of the second encoding parameter ES1 relates to the number of data units recorded in the encoding table T1, so the encoding module 11 can set the identification code or the content code in the encoded unit based on the second information of the second encoding parameter ES1.

The encoding table T1 can be implemented in a memory. The memory may include a plurality of segments. The plurality of segments store the variety of information of the plurality of data units. Each of the recorded positions relates to one of addresses of the plurality of segments.

FIGS. 3A to 3G are schematic diagrams depicting a data encoding and transmission method in accordance with an embodiment of the present disclosure. The following descriptions are to be taken in conjunction with the embodiment of FIG. 1 above.

As shown in FIG. 3A, a data content "ABAAAAAAACC" (a total of 11 characters) to be transmitted is taken as an example. The data content can be directly encoded using binary ASCII coding into an encoded content of 88 bits "0100 0001 0100 0010 0100 0001 0100 0001 0100 0001 0100 0001 0100 0001 0100 0001 0100 0001 0100 0011 0100 0011".

As the encoding table T1 is established initially, the first information of the first encoding parameter FIT1 can be set to "false", and the second information of the second encoding parameter ES1 can be set to "1". In an embodiment, the recorded position "0" in the encoding table T1 is a reserved position, but the present disclosure is not limited as such.

As shown in FIG. 3B, the encoding module 11 reads a first data unit "A" (i.e., binary code "0100 0001") in the data content to be transmitted. A search is performed in the current encoding table T1 shown in FIG. 3A and it is determined that the first data unit "A" does not exist in the current encoding table T1. Accordingly, the encoding module 11 sets the identification code of the first data unit "A" to "0", and directly encodes the unit content of the first data unit "A" to "0100 0001" using the binary ASCII code. Based on the identification code and the unit content, "0 0100 0001" becomes a first encoded unit of an encoded data. The data unit "A" is recorded in the unit content of a recorded position "1" in the encoding table T1, and the number of times encoded of the data unit "A" is "1".

As shown in FIG. 3C, the encoding module 11 reads a second data unit "B" (i.e., binary code "0100 0010") in the data content to be transmitted. A search is performed in the current encoding table T1 shown in FIG. 3B and it is determined that the second data unit "B" does not exist in the current encoding table T1. Accordingly, the encoding module 11 sets the identification code of the second data unit "B" to "0", and directly encodes the unit content of the second data unit "B" as "0100 0010" using the binary ASCII code. Based on the identification code and the unit content, "0 0100 0010" becomes a second encoded unit of the encoded data. The data unit "B" is recorded in the unit content of a recorded position "2" in the encoding table T1, and the number of times encoded of the data unit "B" is "1".

As shown in FIG. 3D, the encoding module 11 reads a third data unit "A" (i.e., binary code "0100 0001") in the data content to be transmitted. A search is performed in the current encoding table T1 shown in FIG. 3C and it is determined that the third data unit "A" already exists in the current encoding table T1, and the current first information of the first encoding parameter FIT1 (FIG. 3C) is "false", indicating that the data unit previous encoded (i.e., the second data unit "B") was not encoded using the content information recorded in the encoding table T1. The encoding module 11 can then encodes the identification code of the third data unit "A" as "1", meaning that the encoding status of the current third data unit "A" is changed from direct encoding status of the previous (second) data unit "B" to an encoding status that encodes based on the content information recorded in the encoding table T1 (i.e., lookup-table encoding), and the first information of the first encoding parameter FIT1 is updated to "true".

In an embodiment, the numerical value of the second information of the second encoding parameter ES1 relates to the number of encoded units recorded in the encoding table T1, wherein as the number of encoded units recorded in the encoding table T1 increases, the length of the encoding table T1 and the length of the pages change. When the numerical value of the second information of ES1 is n, where n is an integer greater than 0, the encoding table T1 has a total of n pages, and each of the pages can accommodate up to $2^n$ units, so there can be a total of $2^n*n$ units. Therefore, when the size of the content size of the encoding table T1 is $m>2^n*n$, the numerical value of the second information of ES1 must increase to provide sufficient information for encoding.

As shown in FIG. 3D, there are a total of 3 encoded units in the encoding table T1 at recorded positions 0, 1 and 2, respectively, and the numerical value of the second information of the second encoding parameter ES1 is 1, the content size of the encoding table T1 is m=3, and $3>(2^1*1=2)$, so the encoding module 11 will update the numerical value of the second information of the second encoding parameter ES1. In other words, the current second information of the second encoding parameter ES1 ("1") is incremented by 1 to become "2", so that $3<(2^2*2)$.

The encoding module 11 calculates the page number P of the encoding table T1 in which the unit content "A" appears, i.e., $P=\lceil(1+1)/2^2\rceil=1$. This indicates that the third data unit "A" is already recorded in page 1 of the encoding table (page number is 1). If it is in the second page, page number P is 01; if it is in the third page, the page number P is 001, and so on. $P=\lceil(1+1)/2^2\rceil=1$ is based on the equation $P=\lceil(x+1)/2^{ES}\rceil$ wherein the value of the page number P and x indicate the page location and the sequence position (recorded position value) of the data unit content to be transmitted in the encoding table T1, ES is the numerical value of the second information of the second encoding parameter ES1, and $\lceil\ \rceil$ indicates unconditional carry.

The encoding module 11 calculates the numerical value of a location code S of the third data unit "A", i.e., $S=(1)\%2^2=1$. At this time, the second information of the second encoding parameter ES1 is "2", and the value of the location code S represented is "1" and is represented as "01" in two-bit binary. The $S=(1)\%2^2=1$ is based on the equation of $S=(x+1)\%\ 2^{ES}$, wherein % is the modulo operation. Therefore, based on the identification code "1", the page number P "1" and the location code S "01", the encoding module 11 obtains the third encoding unit as "1101".

The encoding module 11 then increments the number of times encoded ("1") for data unit content "A" in FIG. 3C by 1 to become "2". In addition, the recorded positions of the data units are ordered according to the number of times encoded for each of the data units recorded in the encoding table T1. For example, in FIG. 3D, the number of times encoded for data unit content "A" is 2 and the number of times encoded for data unit content "B" is 1. Therefore, the data unit content "A" is placed before the data unit content "B", at recorded positions "1" and "2", respectively, as can be seen in the encoding table T1 shown in FIG. 3D, but the order of the recorded positions of the present disclosure is not limited as such.

Figure 3E:
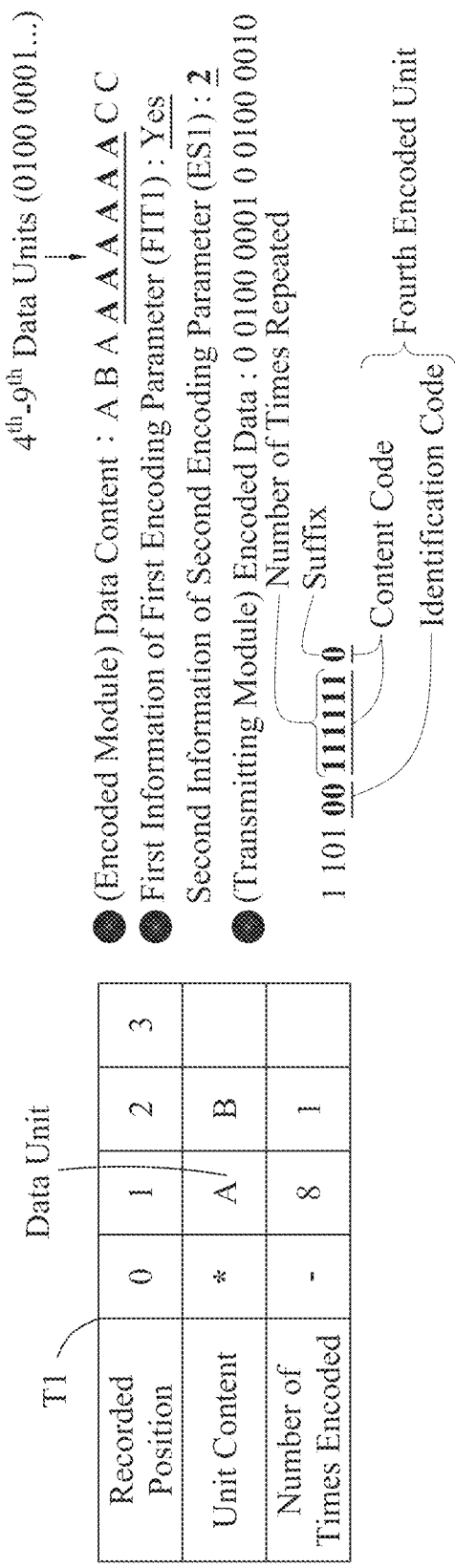

Next, as shown in FIG. 3E, the encoding module 11 reads a fourth data unit "A" (i.e., with a binary code of "0100 0001") in the data content to be transmitted. A search is performed in the current encoding table T1 as shown in FIG. 3D, and it is determined that the fourth data unit "A" already exists in the current encoding table T1. The current first information of the first encoding parameter FIT1 (in FIG. 3D) is "true", indicating that the data unit previous encoded (i.e., the third data unit) was encoded using the content information recorded in the encoding table T1. It is also found that the content "A" of the fourth data unit is the same as the content "A" of the previous (i.e., the third) data unit.

At this time, the encoding module 11 further checks the subsequent consecutive data unit contents to be transmitted to see if they are the same as the current data unit content to be transmitted. As shown in FIG. 3E, the following $5^{th}$ to $9^{th}$ data units all have the same content "A", and, therefore, the number of repetitions is 6 (i.e., from the $4^{th}$ to the $9^{th}$ data units "AAAAAA"), so the encoding module 11 performs a simple consecutive encoding on the $4^{th}$ to the $9^{th}$ h data units to be transmitted.

Meanwhile, the first information of the first encoding parameter FIT1 is "true", and the second information of the second encoding parameter ES1 is "2", so the encoding module 11 encodes the identification code for the $4^{th}$ to the $9^{th}$ data units "A" as "00", indicating that the encoding status is changed from the lookup-table encoding status of the third data unit to a non-lookup-table encoding status, in this embodiment, from the lookup-table encoding status to a simple consecutive encoding status. Then, the encoding module 11 adds six "1s" to the content code ("111111") to represent the number of repetitions (from the $4^{th}$ to the $9^{th}$ data units), and a suffix "0" is added for the end of the content code. Based on the identification code, the content code and the suffix, a fourth encoding unit "00 111111 0" can be obtained, with a total of 9 bits.

The encoding module 11 then increments the number of times encoded ("2") for data unit content "A" in FIG. 3D by 6 to get "8". According to the number of times encoded for each of the data units recorded in the encoding table T1, the data unit content "A" is placed before the data unit content "B", at recorded positions "1" and "2", respectively, as seen in the encoding table T1 shown in FIG. 3E.

In an embodiment, the encoding module 11 may additionally perform the lookup-table encoding on the $4^{th}$ to the $9^{th}$ data units "AAAAAA" to obtain a content code of "101101101101101" for these 6 data units. This is a total of 12 bits. Next, the unit lengths of the encoding units obtained by the simply consecutive encoding and the lookup-table encoding are compared. In an embodiment, the comparison indicates that the unit length of the encoding unit obtained by the simply consecutive encoding is shorter (e.g., 9 bits in FIG. 3D), so the encoding module 11 chooses to use the shorter encoding unit to minimize the amount of data transmitted.

Figure 3F:
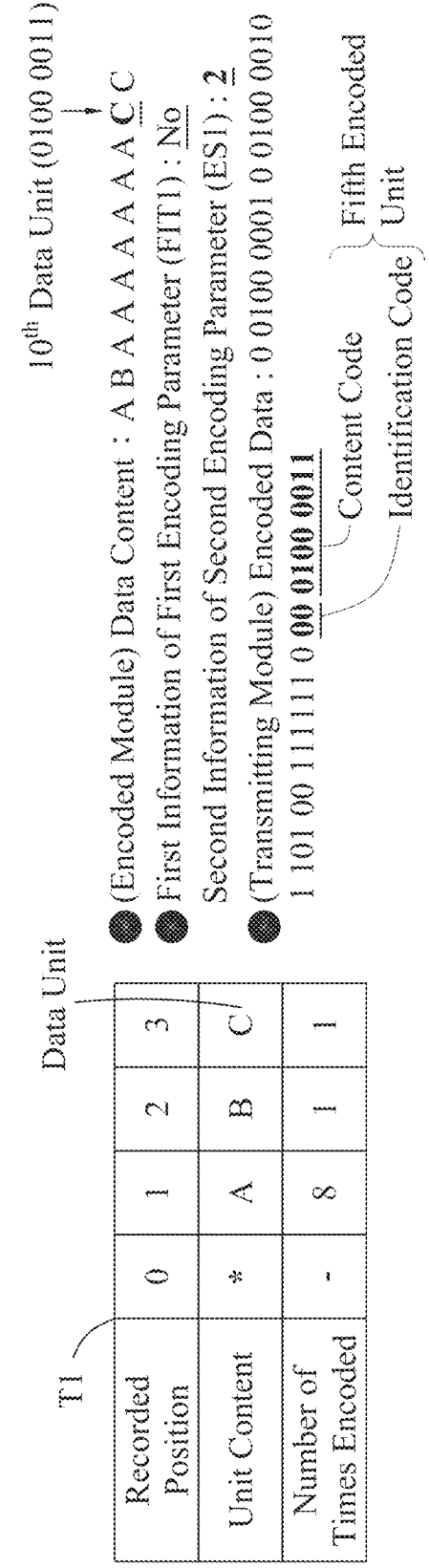

Next, as shown in FIG. 3F, the encoding module 11 reads a $10^{th}$ data unit "C" (i.e., with a binary code of "0100 0011") in the data content to be transmitted. A search is performed in the current encoding table T1 as shown in FIG. 3E, and it is determined that the $10^{th}$ data unit "C" does not exist in the current encoding table T1. Therefore, the encoding module 11 directly encodes the content code of the $10^{th}$ data unit "C" as "0100 0011" based on the binary ASCII code.

At this time, the current first information of the first encoding parameter FIT1 in FIG. 3E is "true", meaning that the previous data unit was encoded using content information recorded in the encoding table T1, and the current second information of the second encoding parameter ES1 in FIG. 3E is "2". Thus, the encoding module 11 first encodes the identification code of the $10^{th}$ data unit "C" in FIG. 3F as "00", indicating that the encoding status is changed from the lookup-table encoding status to a non-lookup-table encoding status, in this embodiment, from the lookup-table encoding status to the direct encoding status, and the first information of the first encoding parameter FIT1 is changed to "false". Then, based on the identification code and the content code, the $5^{th}$ encoding unit becomes "00 0100 0011". Moreover, since the content "C" of this data unit does not exist in the current encoding table T1, the encoding module 11 records the data unit "C" in the unit content at a recorded position "3" in the encoding table T1, and the number of times encoded for the data unit "C" is "1". Based on the number of times encoded for each of the data units "A", "B" and "C", the data units "A", "B" and "C" are placed at recorded positions "1", "2" and "3", respectively.

Figure 3G:
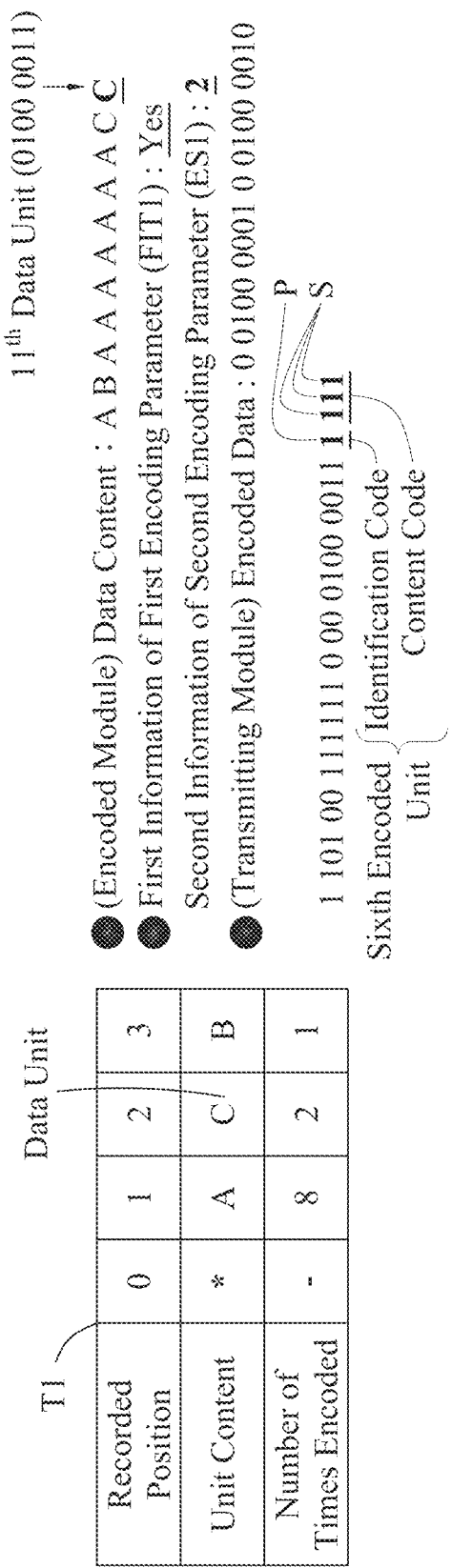

As shown in FIG. 3G, the encoding module 11 reads an $11^{th}$ data unit "C" (i.e., with a binary code of "0100 0011") in the data content to be transmitted. A search is performed in the current encoding table T1 as shown in FIG. 3F, and it is determined that the $11^{th}$ data unit "C" already exists in the current encoding table T1. Meanwhile, the first information of the first encoding parameter FIT1 is "false", meaning that the $10^{th}$ data unit "C" was not encoded using content information recorded in the encoding table T1, so the encoding module 11 encodes the identification code of the $11^{th}$ data unit "C" as "1", indicating that the encoding status of the current $11^{th}$ data unit "C" is changed from the direct encoding status of the previous data unit to an encoding status that encodes based on the content information recorded in the encoding table T1 (i.e., the lookup-table encoding), and the first information of the first encoding parameter FIT1 is updated to "true".

The encoding module 11 checks the content size of the encoding table T1 and the numerical value of the second information of the second encoding parameter ES1. The content size of the encoding table T1 is currently "4", i.e., including four data units at the recorded positions "0", "1", "2" and "3", so the content size of the encoding table T1 is m=4, ES1=2, and $4<(2^{2}*2=8)$. Therefore, the second information of the second encoding parameter ES1 does not need to be updated.

The encoding module 11 then calculates the page number P of the content of the $11^{th}$ data unit "C" in the encoding table T1, i.e., $P=\lceil(3+1)/2^{2}\rceil=1$, indicating that the content of $11^{th}$ data unit "C" exists in page 1. If it is in page 2, then P is 01; page 3, P is 001, and so on. The encoding module 11 further calculates the location code S for the content of the $11^{th}$ data unit "C", i.e., $S=(3)\%2^{2}=3$, wherein the second information of the second encoding parameter ES1 is "2". The location code S "3" is represented as two-bit binary "11". Therefore, based on the identification code "1", the page number P "1" and the location code "11", a $6^{th}$ encoding unit "1111" can be obtained, with a total of 4 bits.

The encoding module 11 then increments the number of times encoded ("1") for data unit content "C" in FIG. 3F by 1 to get "2". According to the number of times encoded for each data unit recorded in the encoding table T1, the data units "A", "C" and "B" are placed at recorded positions "1", "2" and "3", respectively, as seen in the encoding table T1 shown in FIG. 3G.

In this embodiment, the unit contents of data units recorded in the encoding table T1 are not redundant, and the encoding table T1 of the present embodiment records information of a plurality of unique (non-repetitive) data units.

In summary of the above, using the data encoding and transmission method described in the embodiments shown in FIGS. 3A to 3G, the encoding module 11 encodes the 11-bit data contents "ABAAAAAAACC" into a 45-bit encoded data "0 0100 0001 0 0100 0010 1 101 00 111111 0 00 0100 0011 1 111" as shown in FIG. 3G. Compared with the prior art, in which an 88-bit encoded data that would otherwise be obtained by direct encoding based on binary ASCII code, the present disclosure effectively reduces the encoded data by 43 bits.

Figure 4:
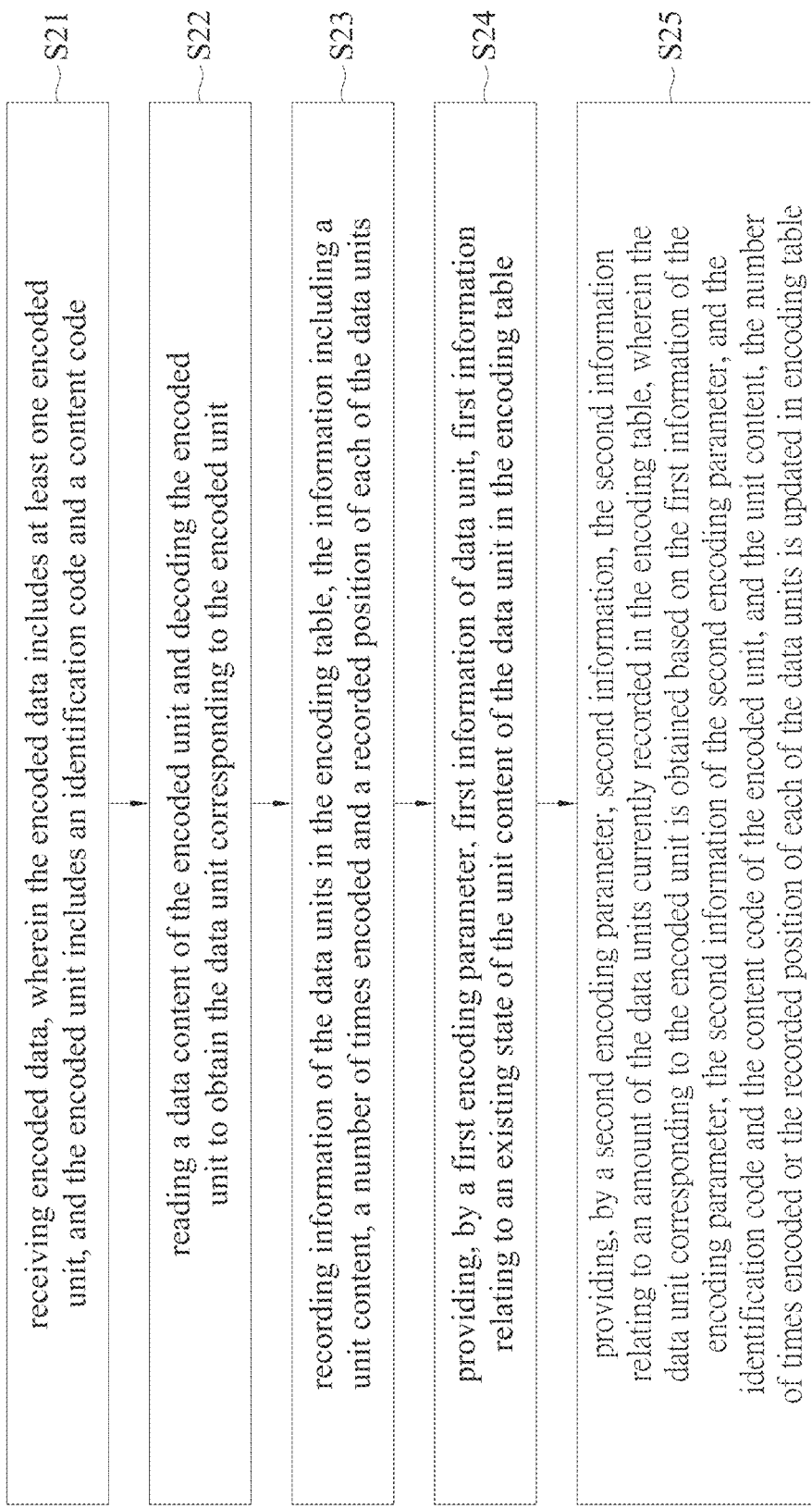
FIG. 4 is a flowchart illustrating a data receiving method in accordance with an embodiment of the present disclosure.

FIG. 4 is a flowchart illustrating a data receiving method in accordance with an embodiment of the present disclosure. The following descriptions are to be taken in conjunction with the data receiving apparatus 2 in FIG. 1 and embodiments shown in FIGS. 5A to 5G. In the embodiment of FIG. 4, the data receiving method includes, but is not limited to, steps S21 to S25, and the present disclosure does not limit the order in which they are executed.

In step S21 of FIG. 4, the receiving module 22 receives encoded data transmitted from the transmitting module 12, wherein the encoded data is produced by the encoding module 11, and includes a plurality of bits having at least one encoding unit (e.g., the encoded data "0 0100 0001 0 0100 0010 1 101 00 111111 0 00 0100 0011 1 111" in FIG. 5A includes 45 bits), and each of the encoded units includes an identification code and a content code.

In step S22 of FIG. 4, the decoding module 21 reads a data content of the at least one encoded unit received by the receiving module 22, and decodes the at least one encoded unit to obtain a data unit corresponding to the encoded unit.

Figure 5E:
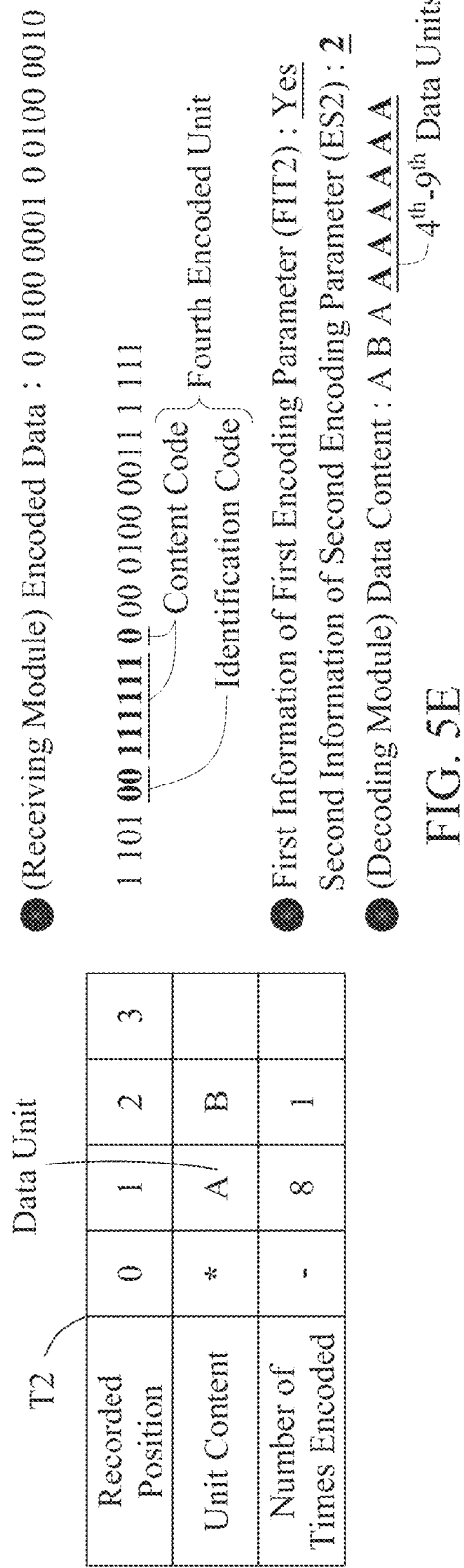
Figure 5F:
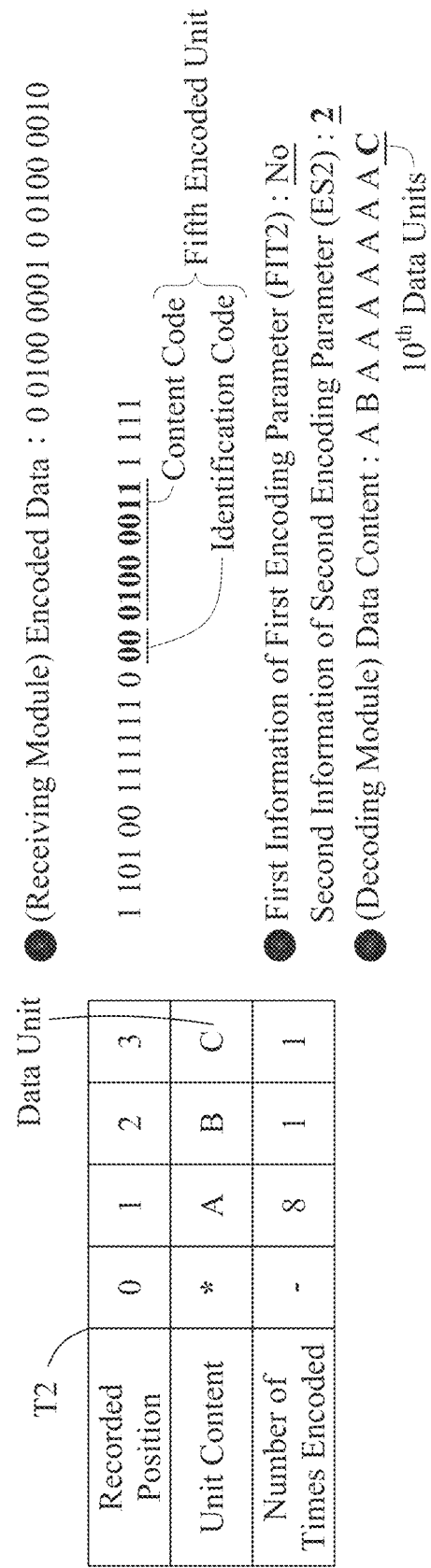

In step S23 of FIG. 4, the encoding table T2 records a variety of information of a plurality of data units (e.g., data units "A", "B" and "C" in the encoding table T2 in FIGS. 5B 5F), and the variety of information includes a unit content, the number of times encoded, and the recorded position of each of the data units recorded in the encoding table T2.

In step S24 of FIG. 4, a first encoding parameter FIT2 provides a first information of the encoded unit read by the decoding module 21 (e.g., the first information of the first encoding parameter FIT2 in FIG. 5B is "false", wherein the first information relates to the existing state of the unit content of the encoded unit read by the decoding module 21 in the encoding table T2.

In step S25 of FIG. 4, a second encoding parameter ES2 provides a second information (e.g., the second information "1" of the second encoding parameter ES2 of FIG. 5B), wherein the second information relates to the amount of data units currently recorded in the encoding table T2. Moreover, based on the first information of the first encoding parameter FIT2, the second information of the second encoding parameter ES2, the identification code and the content code of the encoded unit, the data unit corresponding to the encoded unit can be obtained. Moreover, the unit content, the number of times encoded or the recorded position of the data unit recorded the encoding table T2 is updated.

The encoding table T2 can be implemented in a memory. The memory may include a plurality of segments. The plurality of segments store the variety of information of the plurality of data units. Each of the recorded positions relates to one of addresses of the plurality of segments.

FIGS. 5A to 5G are schematic diagrams depicting a data receiving and decoding method in accordance with an embodiment of the present disclosure. The following descriptions are to be taken in conjunction with the embodiment of FIG. 1.

As shown in FIG. 5A, the receiving module 22 of the data receiving apparatus 2 receives an encoded data encoded by the data transmitting apparatus 1. For example, the encoded data is "0 0100 0001 0 0100 0010 1 101 00 111111 0 00 0100 0011 1 111" as shown in FIG. 3G.

As the encoding table T2 is established initially, the first information of the first encoding parameter FIT2 can be set to "false", and the second information of the second encoding parameter ES2 can be set to "1". The recorded position "0" in the encoding table T2 can be made as a reserved location for identification purposes, but the present disclosure is not limited as such.

As shown in FIG. 5B, the current first information of the first encoding parameter FIT2 shown in FIG. 5A is "false", indicating currently the direct encoding mode is used. The first bit of the encoded data read by the decoding module 21 is "0", which is the identification code of a first encoded unit to be decoded, indicating that the content code of the first encoded unit to be decoded was directly encoded based on, for example, the binary ASCII code and transmitted, so the decoding module 21 reads the 8 bits "0100 0001" following the identification code "0" of the first encoded unit to obtain a first data unit with data content "A" after decoding. Moreover, the first data unit "A" is added to the unit content at a recorded position "1" in the encoding table T2, and the number of times encoded for the data unit "A" is recorded as "1".

As shown in FIG. 5C, the current first information of first encoding parameter FIT2 in FIG. 5B is "false", indicating that currently the direct encoding mode is used. The $10^{th}$ bit of the encoded data read by the decoding module 21 is "0", which is the identification code of a second encoded unit to be decoded, indicating that the content code of the second encoded unit to be decoded was directly encoded based on, for example, the binary ASCII code and transmitted, so the decoding module 21 reads the 8 bits "0100 0010" following the identification code "0" of the second encoded unit to obtain a second data unit with data content "B" after decoding. Moreover, the second data unit "B" is added to the unit content at a recorded position "2" in the encoding table T2, and the number of times encoded for the data unit "B" is recorded as "1".

As shown in FIG. 5D, the current first information of the first encoding parameter FIT2 in FIG. 5C is "false", indicating that currently the direct encoding mode is used. The $19^{th}$ bit of the encoded data read by the decoding module 21 is "1", which is the identification code of a third encoded unit to be decoded, indicating that the content code of the third encoded unit to be decoded was encoded using the lookup table, so the decoding module 21 changes the first information of the first encoding parameter FIT2 to "true".

The decoding module 21 calculates the value of the second information of the second encoding parameter ES2. Since the current content size of the encoding table T2 is 3, and $3>(2^1*1=2)$, the value of the second information of the second encoding parameter ES2 in FIG. 5C must be increased, for example, by 1 (i.e., the second information of the second encoding parameter ES2 is changed to "2"), such that $3<(2^2*2)$.

The decoding module 21 determines a distance D between the next "1" and a bit immediately following the 19th bit (i.e., the identification code of the third encoded unit) of the received encoded data, and the page number P for the content of the third encoded unit in the encoding table T2 can be obtained using the equation P=D+1. In FIG. 5D, for example, the decoding module 21 searches and finds that the next "1" following the identification code of the third encoded unit is at the 20th bit, so the distance D between the next "1" and the bit immediately following the 19th bit is "0", and thus the page number of "1". In addition, a relationship (D=0)<(ES=2) is determined, so the third encoded unit to be decoded can indeed be decoded by looking up the encoding table T2, wherein ES is the value of the second information of the second encoding parameter ES2.

The decoding module 21 further calculates the location code S of the content of the third encoded unit to be decoded in the encoding table T2. Since ES2=2, the decoding module 21 reads two bits (i.e., 21th and $22^{nd}$ bits of the received encoded data) following the page number (i.e., "1") to obtain a two-bit location code S "01", which means that the value of the location code is 1. Therefore, based on the page number P and the location code S, the decoding module 21 can determine that the content of the third encoded unit can be found at the recorded position "1" (using an equation $2^Es*D+S$, i.e., $2^2*0+1=1$), which is "A" at the recorded position of the encoding table T2. Moreover, the decoding module 21 increments the number of times encoded ("1") for the data unit "A" in the current encoding table T2 (i.e., the encoding table T2 in FIG. 5C) by 1 to get "2". Then, based on the number of times encoded for each data unit, the data units "A" and "B" are placed at the recorded positions "1" and "2", respectively, in the updated encoding table T2 shown in FIG. 5D.

Next, as shown in FIG. 5E, the decoding module 21 reads the $23^{rd}$ bit of the received encoded data in order to decode a fourth encoded unit. The current first information of the first encoding parameter FIT2 is "true", indicating that currently the lookup-table encoding mode is used. Therefore, the decoding module 21 searches for the bit of the next "1" following the $23^{rd}$ bit of the received encoded data and determines that it is two bits away, meaning the distance D=2. Since distance (D=2)=(ES=ES2=2), it is confirmed that the encoded units starting from the fourth encoded units were encoded using the simple consecutive encoding.

The decoding module 21 sequentially reads each bit starting from the $25^{th}$ bit of the received encoded data unit it reaches a "0" (i.e., the $31^{st}$ bit of the received encoded data). The "0" indicates the ending of the unit content in the encoded unit according to the simple consecutive encoding. "111111" are obtained from $25^{th}$ to $30^{th}$ bits of the received encoded data unit, indicating there are 6 data units that repeat the previous one. Accordingly, the fourth encoded unit is decoded as "AAAAAA" as $4^{th}$ to $9^{th}$ data units. Moreover, the number of times encoded for the unit content "A" in the current encoding table T2 (i.e., the encoding table T2 shown in FIG. 5C) is added by "6" to get "8", and based on the number of times encoded for each data unit, the data units "A" and "B" are placed at the recorded positions "1" and "2", respectively, in the updated encoding table T2 shown in FIG. 5E.

Next, as shown in FIG. 5F, the decoding module 21 reads the $32^{nd}$ bit of the received encoded data in order to decode a fifth encoded unit. The current first information of the first encoding parameter FIT2 in FIG. 5E is "true", indicating that currently the lookup-table encoding mode is used. Therefore, the decoding module 21 searches for the bit of the next "1" following the $32^{nd}$ bit of the received encoded data and determines that it is three bits away (i.e., the $35^{th}$ bit of the received encoded data unit), meaning the distance D=3. Since distance (D=3)>(ES=ES2=2), the content code of the fifth encoded unit was directly encoded instead of lookup-table encoded. The decoding module 21 then changes the first information of the first encoding parameter FIT2 to "false", and reads 8 bits "0100 0011" following the identification code "00" of the fifth encoded unit to obtain the $10^{th}$ data unit with data content "C". Then, the data unit "C" is added to the unit content at a recorded position "3" in the encoding table T2, and the number of times encoded for the data unit "C" is set to "1". Based on the number of times encoded for each of the data units, the data units "A", "B" and "C" are placed at the recorded positions "1", "2" and "3", respectively, in the updated encoding table T2 shown in FIG. 5F.

Figure 5G:
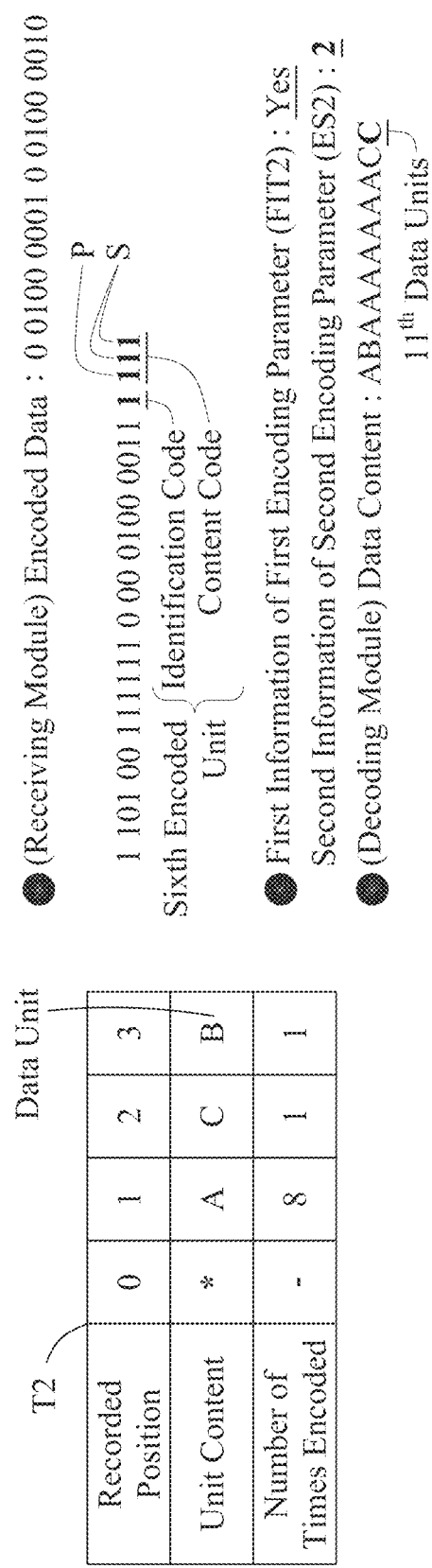

Next, as shown in FIG. 5G, the decoding module 21 reads the $42^{nd}$ bit of the received encoded data in order to decode a $6^{th}$ encoded unit. The current first information of the first encoding parameter FIT2 in FIG. 5F is "false", indicating that currently the direct encoding is used. The decoding module 21 reads the $42^{nd}$ bit of the received encoded data unit to be "1", which is the identification code of the sixth encoding unit, indicating that the content code of the sixth encoded unit was encoded using lookup-table encoding, so the decoding module 21 updates the first information of the first encoding parameter FIT2 to be "true".

The decoding module 21 determines the value of the second information of the second encoding parameter ES2. Since the current content size of the encoding table T2 is 4, and $4<(2^2*2=8)$, so the second information of the second encoding parameter ES2 does not need to be adjusted.

The decoding module 21 calculates the page number of the content of the $6^{th}$ encoded unit in the encoding table T2 (i.e., P=D+1). In other words, the decoding module 21 determines the distance D between the next "1" after the identification code and the bit immediately after the identification code. As the next "1" is found immediately after the identification code, D=0, and (D=0)<(ES=2). Therefore, it is confirmed that the unit content of the $6^{th}$ encoded unit can be obtained from the encoding table T2, and page number equals "1".

The decoding module 21 further calculates the location code S of the content of the 6th encoded unit in the encoding table T2. Since ES2=2, the decoding module 21 reads two bits following the page number (i.e., "1") to obtain a two-bit location code S "11", which means that the value of the location code is 3. Therefore, based on the page number P and the location code S, the decoding module 21 can determine that the content of the $6^{th}$ encoded unit can be found at the recorded position "3" (using the equation $2^{ES}*D+S$, i.e., $2^2*0+3=3$), which is "C" at the recorded position of the encoding table T2. Moreover, the decoding module 21 increments the number of times encoded ("1") for the data unit "C" in the current encoding table T2 (i.e., the encoding table T2 in FIG. 5F) by 1 to get "2". Then, based on the numbers of times encoded for the data units "A", "B" and "C", the data units "A", "C" and "B" are placed at the recorded positions "1", "2" and "3", respectively, in the updated encoding table T2 shown in FIG. 5G.

Figure 6B:
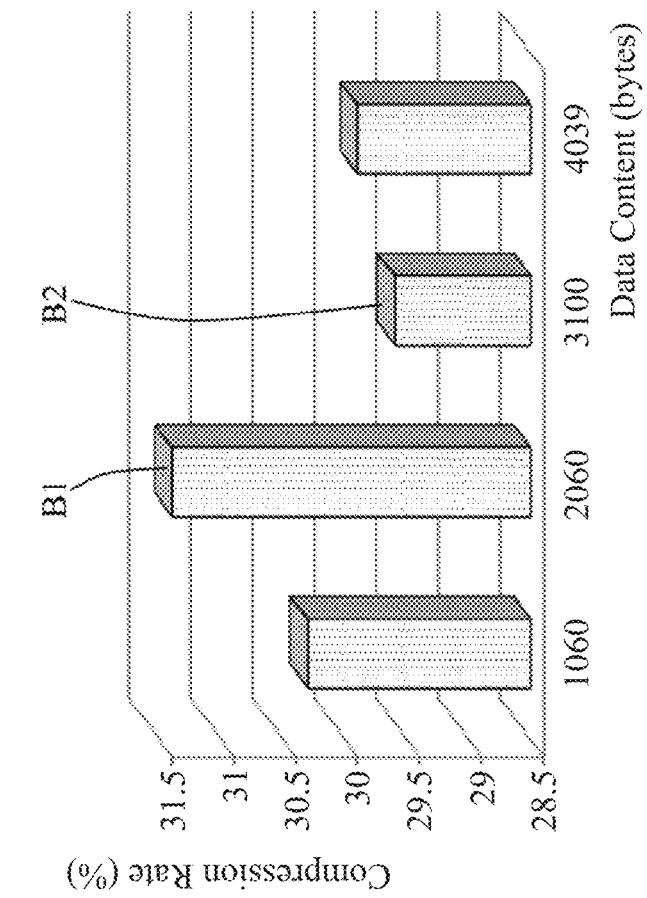
FIG. 6B is a graph depicting an experiment on the compression rate speed of the data transmission apparatus or method in accordance with the present disclosure.
Figure 6A:
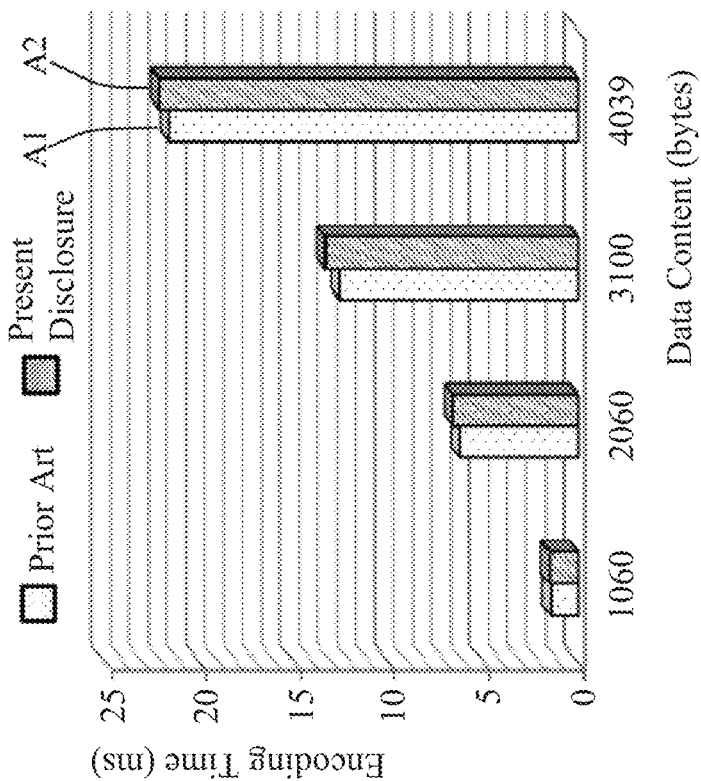
FIG. 6A is a graph depicting an experiment on the encoding speed of the data transmission apparatus or method in accordance with the present disclosure.
Figure 6C:
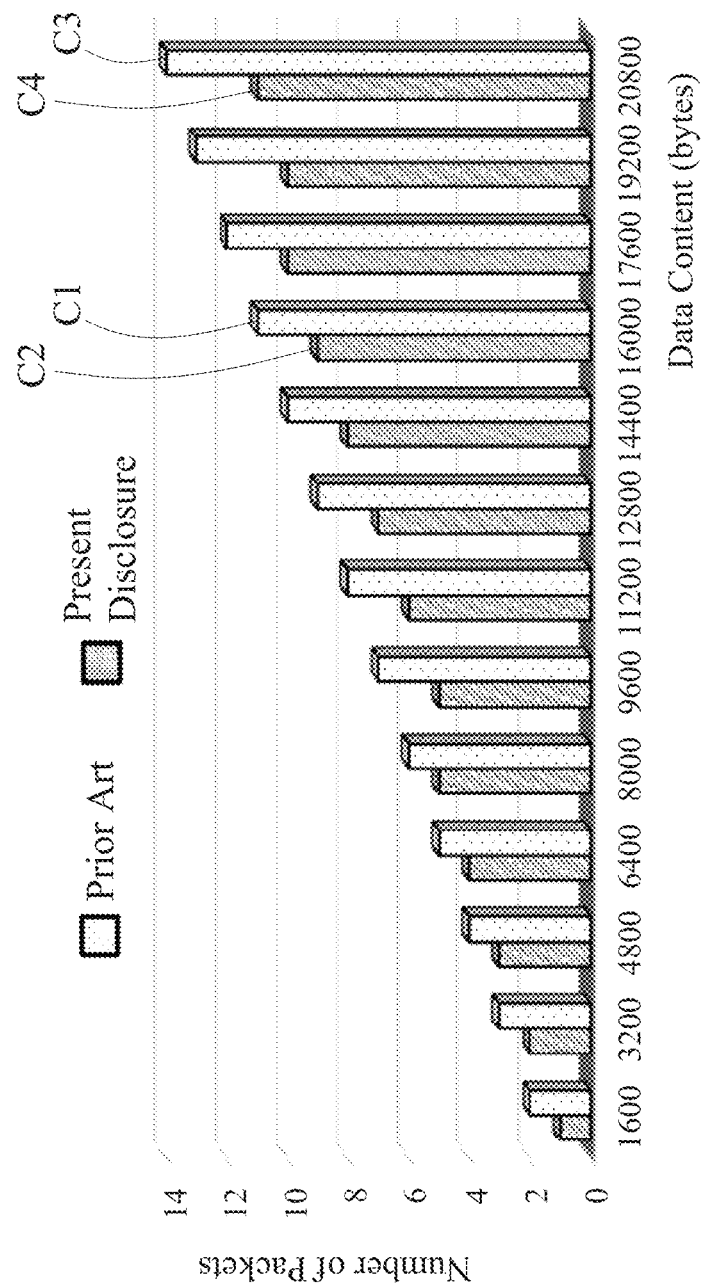
FIG. 6C is a graph depicting an experiment on the number of packets of the data transmission apparatus or method in accordance with the present disclosure.

FIG. 6A is a graph depicting an experiment on the encoding speed of the data transmission apparatus or method in accordance with the present disclosure. FIG. 6B is a graph depicting an experiment on the compression rate speed of the data transmission apparatus or method in accordance with the present disclosure. FIG. 6C is a graph depicting an experiment on the number of packets of the data transmission apparatus or method in accordance with the present disclosure.

In the simulation environment and parameters of FIGS. 6A to 6C, an OPC UA server is connected to an OPC UA client, and OPC UA binary coding is used as the comparison object. Actual OPC UA transmission packet (browse) contents (i.e., data contents) are used as the subject for compression. The packets of the data browser to be transmitted are tested based on their sizes from the smallest to the largest.

As shown in FIG. 6A, in terms of the encoding speed, while data contents of 4039 bytes are taken as an example, the encoding time for prior art (see long bars A1) was approximately 21 ms, whereas the encoding time for present disclosure (see long bars A2) was approximately 22 ms. Therefore, there is only a slight difference between the encoding speeds of the data transmitting apparatus or method of the present disclosure and the prior art.

As shown in FIG. 6A, in terms of the compression rate, while data contents of 2060 bytes are taken as an example, the compression rate for present disclosure (see long bars B1) was approximately 31.3%. While data contents of 3100 bytes are taken as another example, the compression rate for present disclosure (see long bars B2) was approximately 29.5%. Therefore, the data transmitting apparatus or method of the present disclosure can achieve a compression rate of around 30%.

As shown in FIG. 6C, in terms of the number of packets, while data contents of 16000 bytes are taken as an example, the number of packets for prior art (see long bars C1) was 11, whereas the number of packets for present disclosure (see long bars C2) was 9, so the present disclosure was able to reduce the number of packets by about 22%. While data contents of 20800 bytes are taken as another example, the number of packets for prior art (see long bars C3) was 14, whereas the number of packets for present disclosure (see long bars C4) was 11, so the present disclosure was able to reduce the number of packets by about 27%. Therefore, under the same amount of data contents (amount of data), the number of packets transmitted by the data transmitting apparatus or method of the present disclosure can be reduced by about 20% to 30%.

From the above, it is clear that the data transmitting apparatus, the data receiving apparatus and the methods thereof according to the present disclosure essentially use the encoding/decoding module for encoding/decoding to dynamically establish or lookup the encoding table, and are able to perform condense consecutive or repetitive data, thereby reducing encoded data and the number of packets transmitted.

Moreover, the present disclosure is capable of dynamically arranging the data units in the encoding table according to the number of times they were encoded, such that data units that appear more often will be placed at the front of the encoding table, and shorter encoded data can be used for transmission to reduce the number of packets transmitted.

Besides, the preset disclosure is capable of hiding the information of the encoding parameters in the encoded data using adaptive encoding table or pages, and thus there is no need to additionally transmit the encoding table, thereby reducing the amount of data transmitted.

In addition, the encoding method according to the present disclosure does not need to first perform analysis and calculate probability statistics on all of the data contents (or an entire document), and the original reaction time and performance of the data transmitting apparatus and the data receiving apparatus can be maintained without incurring increased hardware resources. As a result, stability of system operations can be ensured, realizing benefits for the data transmitting apparatus, the data receiving apparatus and a standard communication interface all three parties in terms of data encoding/decoding and data transmission.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A data transmitting apparatus, comprising:
    an encoding module configured for reading a data content including at least one of a plurality of data units and encoding the data units, wherein the encoding module is an encoder, a processor, an arithmetic logic unit (ALU) or an integrated circuit (IC),
    wherein an encoding table records a variety of information of the plurality of data units, the variety of information including a unit content, a number of times encoded and a recorded position of each of the data units,
    wherein a first encoding parameter provides first information of the data unit read by the encoding module, and the first information of the first encoding parameter relates to an existing state of the unit content of the data unit in the encoding table recording the unit content, the number of times encoded and the recorded position of each of the data units, wherein when the existing state of the unit content of the data unit in the encoding table recording the unit content, the number of times encoded and the recorded position of each of the data units relating to the first information of the first encoding parameter is false, the encoding module sets an identification code of an encoded unit and then directly encodes the unit content of the data unit as a content code of the encoded unit, and the encoded unit sequentially includes the identification code and the content code,
    wherein a second encoding parameter provides second information, and the second information relates to an amount of data units currently recorded in the encoding table recording the unit content, the number of times encoded and the recorded position of each of the data units; and
    a transmitting module configured for transmitting an encoded data encoded by the encoding module, wherein the encoded data includes the encoded unit corresponding to the data unit, wherein the transmitting module is a transmitter, an input/output (I/O) interface, a communication interface, an antenna or a network card,
    wherein the encoding module sets the identification code and the content code of the encoded unit based on the first information of the first encoding parameter and the second information of the second encoding parameter, and updates the unit content, the number of times encoded or the recorded position of the data unit recorded in the encoding table.

2. The data transmitting apparatus of claim 1, wherein each of the plurality of data units in the encoding table is placed at one of the recorded positions according to a value of the number of times encoded of the data unit.

3. The data transmitting apparatus of claim 1, wherein when the existing state relating to the first information of the first encoding parameter is true, and the unit content of the data unit read by the encoding module exists in one of the plurality of data units recorded in the encoding table, the encoding module sets the identification code or the content code of the encoded unit based on the second information of the second encoding parameter.

4. The data transmitting apparatus of claim 1, wherein the encoding table is implemented in a memory including a plurality of segments for storing the variety of information of the plurality of data units, and the recorded positions relate to addresses of the plurality of segments.

5. A data transmitting method, comprising:
    reading, by an encoding module, a data content including at least one of a plurality of data units, and encoding the data unit, wherein the encoding module is an encoder, a processor, an arithmetic logic unit (ALU) or an integrated circuit (IC);
    recording a variety of information of the plurality of data units in an encoding table, wherein the variety of information include a unit content, a number of times encoded and a recorded position of each of the data units,
    wherein a first encoding parameter provides first information of the data unit read, and the first information of the first encoding parameter relates to an existing state of the unit content of the data unit in the encoding table recording the unit content, the number of times encoded and the recorded position of each of the data units, wherein when the existing state of the unit content of the data unit in the encoding table recording the unit content, the number of times encoded and the recorded position of each of the data units relating to the first information of the first encoding parameter is false, the encoding module sets an identification code of an encoded unit and then directly encodes the unit content of the data unit as a content code of the encoded unit, and the encoded unit sequentially includes the identification code and the content code, wherein a second encoding parameter provides second information, and the second information relates to an amount of data units currently recorded in the encoding table recording the unit content, the number of times encoded and the recorded position of each of the data units; and transmitting, by the encoding module, an encoded data encoded, wherein the encoded data includes the encoded unit corresponding to the data unit, wherein the identification code and the content code of the encoded unit are set based on the first information of the first encoding parameter and the second information of the second encoding parameter, and the unit content, the number of times encoded or the recorded position of each of the data units is updated in the encoding table.

6. The data transmitting method of claim 5, further comprising placing each of the plurality of data units recorded in the encoding table at one of the recorded positions according to a value of the number of times encoded of the data unit.

7. The data transmitting method of claim 5, further comprising, when the existing state of the first information relating to the first encoding parameter is true, and the unit content of the data unit read exists in one of the plurality of data units recorded in the encoding table, setting the identification code or the content code of the encoded unit based on the second information of the second encoding parameter.

8. The data transmitting method of claim 5, wherein the encoding table is implemented in a memory including a plurality of segments for storing the variety of information of the plurality of data units, and the recorded positions relate to addresses of the plurality of segments.

9. A data receiving apparatus, comprising:

a receiving module configured for receiving an encoded data, wherein the encoded data includes at least one encoded unit, the encoded unit sequentially including an identification code and a content code, wherein the receiving module is a receiver, an input/output (I/O) interface, a communication interface, an antenna or a network card; and a decoding module configured for reading a data content of the encoded unit received by the receiving module and decoding the encoded unit to obtain a data unit of a plurality of data units corresponding to the encoded unit, wherein the decoding module is a decoder, a processor, an arithmetic logic unit (ALU) or an integrated circuit (IC), wherein a decoding table records a variety of information of the plurality of data units, wherein the variety of information include a unit content, a number of times encoded and a recorded position of each of the data units, wherein a first parameter provides first information of the data unit read by the decoding module, and the first information of the first parameter relates to an existing state of the unit content of the data unit read by the decoding module in the decoding table recording the unit content, the number of times encoded and the recorded position of each of the data units, wherein when the existing state of the unit content of the data unit in the decoding table recording the unit content, the number of times encoded and the recorded position of each of the data units relating to the first information of the first parameter is false, the decoding module decodes the identification code of a decoded unit and then directly decodes the content code of the encoded unit as the unit content of the data unit, wherein a second parameter provides second information, and the second information relates to an amount of data units currently recorded in the decoding table recording the unit content, the number of times encoded and the recorded position of each of the data units, wherein the decoding module obtains the data units corresponding to the encoded units based on the first information of the first parameter, the second information of the second parameter, and the identification code and the content code of the encoded unit, and the decoding module updates the unit content, the number of times encoded or the recorded position of each of the data units in the decoding table.

10. The data receiving apparatus of claim 9, wherein each of the plurality of data units in the decoding table is placed at one of the recorded positions according to a value of the number of times encoded of the data unit.

11. The data receiving apparatus of claim 9, wherein when the existing state of the first information relating to the first parameter is true, and the unit content of the encoded unit read by the decoding module exists in one of the plurality of data units recorded in the decoding table, the decoding module obtains the data unit corresponding to the encoded unit based on the second information of the second parameter.

12. The data receiving apparatus of claim 9, wherein the decoding table is implemented in a memory including a plurality of segments for storing the variety of information of the plurality of data units, and the recorded positions relate to addresses of the plurality of segments.

13. A data receiving method, comprising:

receiving an encoded data, wherein the encoded data includes at least one encoded unit, the encoded unit sequentially including an identification code and a content code;

reading a data content of the encoded unit and decoding the encoded unit to obtain a data unit of a plurality of data units corresponding to the encoded unit; and recording a variety of information of the plurality of data units in a decoding table, wherein the variety of information include a unit content, a number of times encoded and a recorded position of each of the data units, wherein a first parameter provides first information of the data unit read, and the first information of the first parameter relates to an existing state of the unit content of the data unit read in the decoding table recording the unit content, the number of times encoded and the recorded position of each of the data units, wherein when the existing state of the unit content of the data unit in the decoding table recording the unit content, the number of times encoded and the recorded position of each of the data units relating to the first information of the first parameter is false, the identification code of a decoded unit is decoded and then the content code of the encoded unit is directly decoded as the unit content of the data unit, wherein a second parameter provides second information, and the second information relates to an amount of data units currently recorded in the decoding table recording the unit content, the number of times encoded and the recorded position of each of the data units, wherein the data units corresponding to the encoded units are obtained based on the first information of the first parameter, the second information of the second parameter, and the identification code and the content code of the encoded unit, and the unit content, the number of times encoded or the recorded position of each of the data units is updated in the decoding table.

14. The data receiving method of claim 13, wherein each of the plurality of data units in the decoding table is placed at one of the recorded positions according to a value of the number of times encoded of the data unit.

15. The data receiving method of claim 13, further comprising, when the existing state of the first information relating to the first parameter is true, and the unit content of the encoded unit read exists in one of the plurality of data units recorded in the decoding table, obtaining the data unit corresponding to the encoded unit based on the second information of the second parameter.

16. The data receiving method of claim 13, wherein the decoding table is implemented in a memory including a plurality of segments for storing the variety of information of the plurality of data units, and the recorded positions relate to addresses of the plurality of segments.

* * * * *